(12) United States Patent
Miyahara (10) Patent No.: US 8,749,803 B2
(45) Date of Patent: Jun. 10, 2014

(54) IMAGE COPY DEVICE, IMAGE COPY METHOD, INFORMATION PROCESSING DEVICE, AND PROGRAM FOR SCANNING AND COPYING A DOUBLE-SIDED MANUSCRIPT WITHOUT DEGRADING THE SECURITY LEVEL

(75) Inventor: Nobuaki Miyahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 13/324,501

(22) Filed: Dec. 13, 2011

(65) Prior Publication Data

US 2012/0176637 A1 Jul. 12, 2012

(30) Foreign Application Priority Data

Jan. 6, 2011 (JP) ................. 2011-001296

(51) Int. Cl.
*G06F 15/00* (2006.01)
*G06F 3/12* (2006.01)
*G06K 1/00* (2006.01)
*H04N 1/00* (2006.01)
*G06F 17/30* (2006.01)
*G06K 15/00* (2006.01)
*G06K 15/02* (2006.01)

(52) U.S. Cl.
CPC ....... *H04N 1/00883* (2013.01); *H04N 1/00846* (2013.01); *G06F 17/30725* (2013.01); *G06K 15/02* (2013.01)
USPC ........................................ 358/1.13; 358/1.14

(58) Field of Classification Search
CPC ........... H04N 1/00883; H04N 1/00846; G06F 17/30725; G06K 15/02
USPC .............. 358/1.1, 1.13, 1.14, 1.15, 1.18, 3.28
See application file for complete search history.

(56) References Cited

U.S. PATENT DOCUMENTS

| | | | | |
|---|---|---|---|---|
| 8,159,724 B2 * | 4/2012 | Mikami | ................. | 358/3.28 |
| 8,230,494 B2 * | 7/2012 | Saka et al. | ................. | 726/16 |
| 8,482,806 B2 * | 7/2013 | Kaneda | ................. | 358/3.28 |
| 2008/0104715 A1 * | 5/2008 | Saka et al. | ................. | 726/31 |

FOREIGN PATENT DOCUMENTS

JP 2009-284472 A 12/2009

* cited by examiner

*Primary Examiner* — Douglas Tran
(74) *Attorney, Agent, or Firm* — Carter, DeLuca, Farrell & Schmidt, LLP (57) ABSTRACT

A double-sided manuscript is scanned and copied without degrading the security level and information leakage due to copy of the manuscript is prevented. When it is instructed to copy a manuscript in which a code indicating copy permission exists on a first side and the code does not exist on a second side, a copy is output, with one side bearing thereon a copied image of the first side and the other side being blank.

14 Claims, 6 Drawing Sheets

IMAGE COPY DEVICE, IMAGE COPY METHOD, INFORMATION PROCESSING DEVICE, AND PROGRAM FOR SCANNING AND COPYING A DOUBLE-SIDED MANUSCRIPT WITHOUT DEGRADING THE SECURITY LEVEL

BACKGROUND OF THE INVENTION

1. Field of the Invention

The present invention relates to an image copy device, an image copy method, an information processing device, and a program configured to determine whether copy of paper medium is prohibited or permitted by a code provided to the manuscript.

2. Description of the Related Art

According to Japanese Patent Laid-Open No. 2009-284472, in a case where a code exists in the manuscript, detection and decoding of the code are performed from image data obtained by scanning the manuscript. Only when copy permission information is obtained as a result of decoding, the image data is printed. If copy prohibition information is obtained, or detection of a code in the manuscript fails, printing is canceled and no copy of the manuscript is output.

Usually, a double-sided manuscript consisting of a plurality of sheets may include a manuscript with one side being blank (a manuscript with nothing printed on one side, referred to as a one-side-blank manuscript in the following), or a manuscript with both sides being blank (referred to as a both-side-blank manuscript in the following). Since a one-side-blank manuscript has a code indicating copy permission information only on the printed side (front side), the one-sided manuscript has no code printed on the back side. A both-side blank manuscript has no code printed on either side. The following problem arises when printing such a manuscript. That is, when scanning both sides of such a one-side-blank manuscript for copy by a manuscript copy function described in Japanese Patent Laid-Open No. 2009-284472, scanning and copying are canceled due to absence of a copy permission code on the back side of the manuscript, and although copy of the front side is permitted, copy of the front side is prohibited. Similarly, there is a problem that, when a both-side blank manuscript is included in a double-sided manuscript consisting of a plurality of sheets, scanning and copying are canceled and, although copy of other manuscripts is permitted, copy of the other manuscripts is also prohibited.

SUMMARY OF THE INVENTION

It is an object of the present invention to provide an image copy device, an image copy method, an information processing device, and a program which can perform scanning and copy of double-sided manuscript without degrading the security level and can prevent information leakage due to copy of the manuscript.

An image copy device according to the present invention outputs, when instructed to copy a manuscript in which a code indicating copy permission exists on a first side and the code does not exist on a second side, a copy with one side bearing thereon a copied image of the first side and the other side being blank.

An information processing device according to the present invention comprises a read unit configured to sequentially feed a manuscript having a plurality of sheets and optically read both sides of the manuscript; an analysis unit configured to detect and analyze a code included in an image read by the read unit; and an output unit configured to output an image, and the information processing device further comprises a control unit configured to cause the output unit to output, when a code indicating copy permission is detected in one of two images obtained by reading both sides of the manuscript by the read unit and the code is not detected in the other image, an image in which the code has been detected, and to cause the output unit to output, as blank, an output corresponding to the image in which the code has not been detected.

According to the present invention, there is provided an image copy device, an image copy method, an information processing device, and a program capable of scanning and copying a double-sided manuscript without degrading the security level and of preventing information leakage due to copy of the manuscript.

Further features of the present invention will become apparent from the following description of exemplary embodiments (with reference to the attached drawings).

DESCRIPTION OF THE EMBODIMENTS

In the following, an optimal embodiment for implementing the invention will be described, referring to the drawing. Note that the configuration described in the embodiment is only illustrative and does not limit the scope of the invention thereto.

Figure 1:
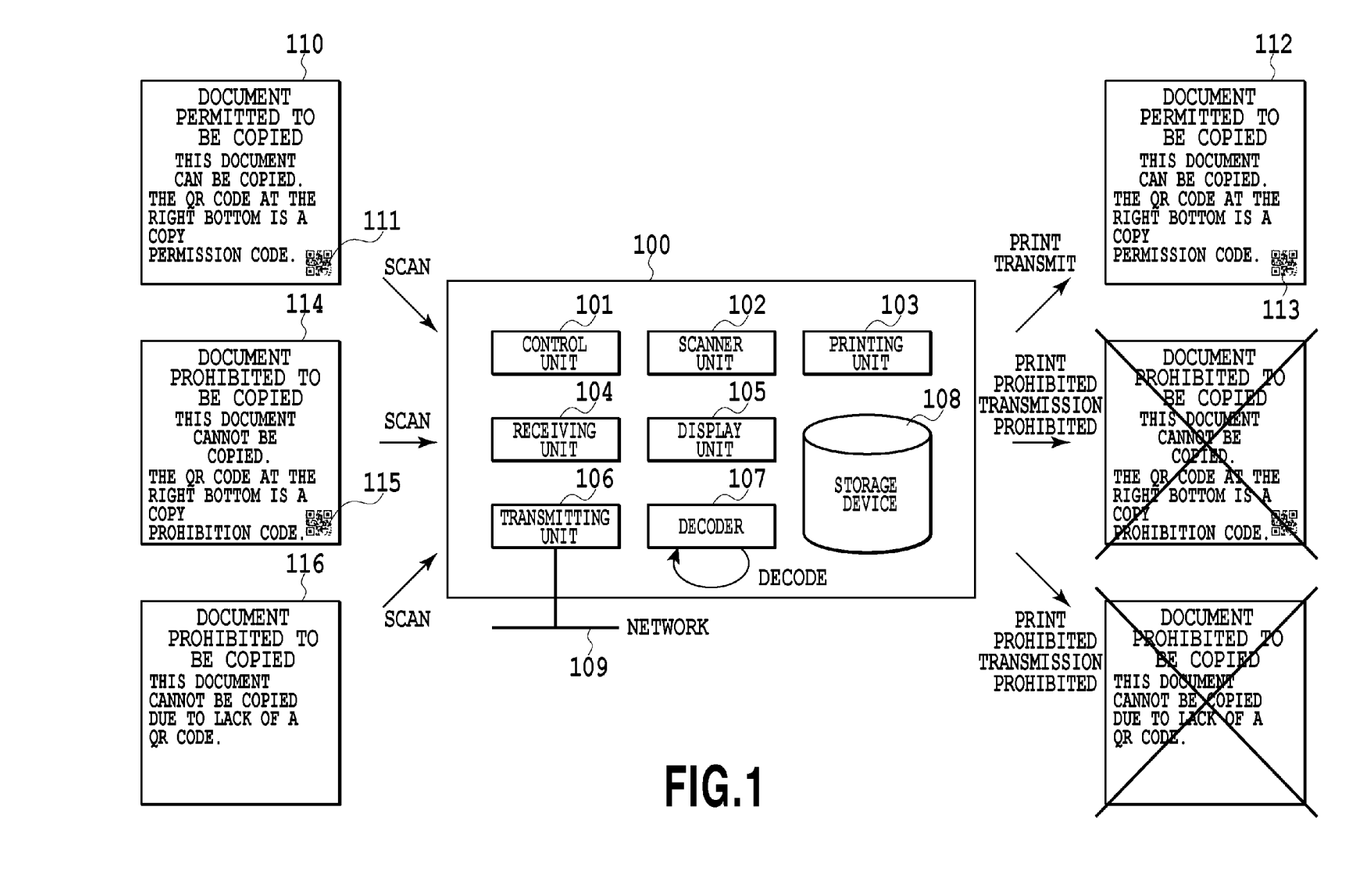
FIG. 1 is a system block diagram in the present embodiment.

FIG. 1 is a block diagram illustrating a configuration of the system in the present embodiment. A multi-function machine 100 comprises a control unit 101, a scanner unit 102, a printing unit 103, a receiving unit 104, a display unit 105, a transmitting unit 106, a decoder 107, and a storage device 108. The multi-function machine 100 functions as an image copy device or an information processing device. The multi-function machine 100 can be replaced by other image copy devices such as a printer, a copier, or the like.

Figures 3, 3A:
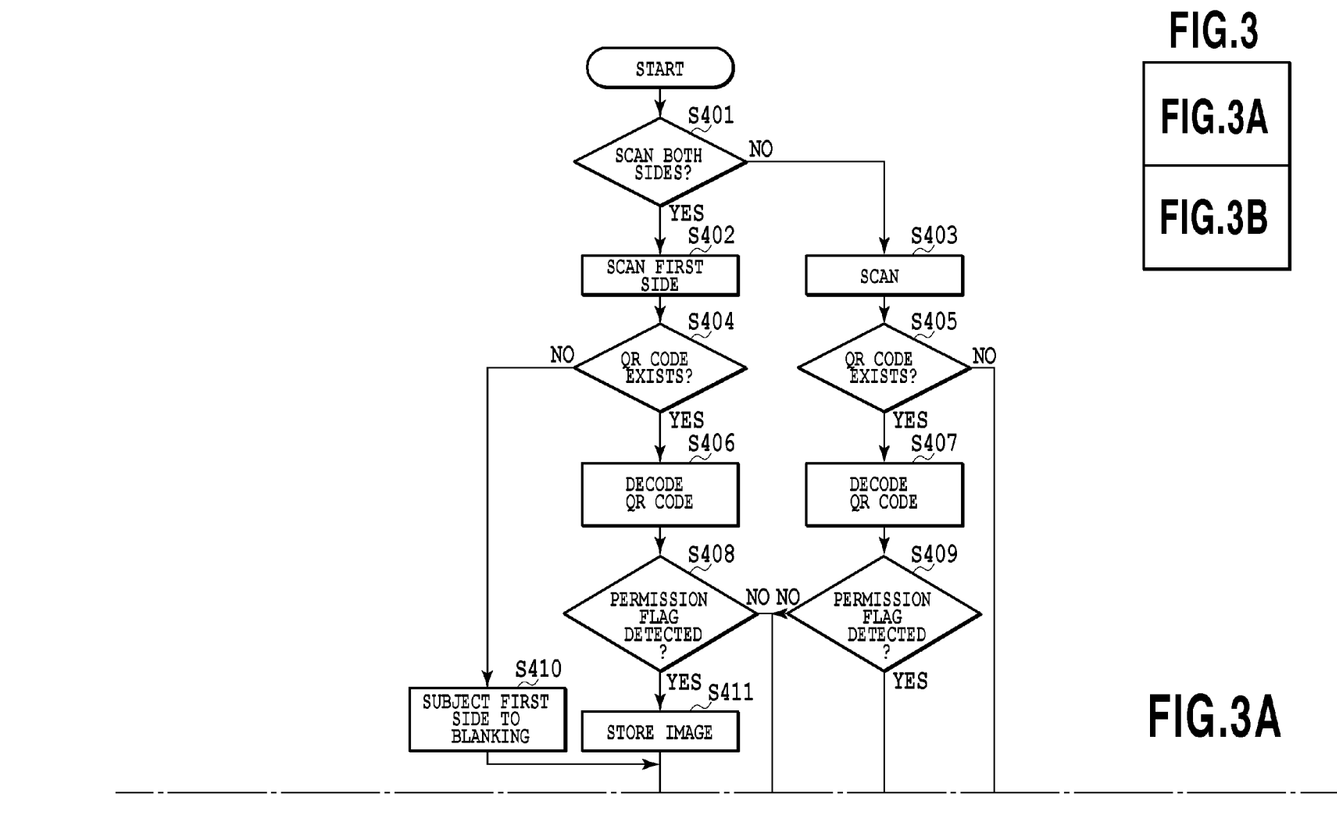
FIG. 3 is a diagram showing the relationship between FIGS. 3A and 3B.
FIG. 3A is a flow chart of one sheet manuscript read operation in the present embodiment.
Figure 3B:
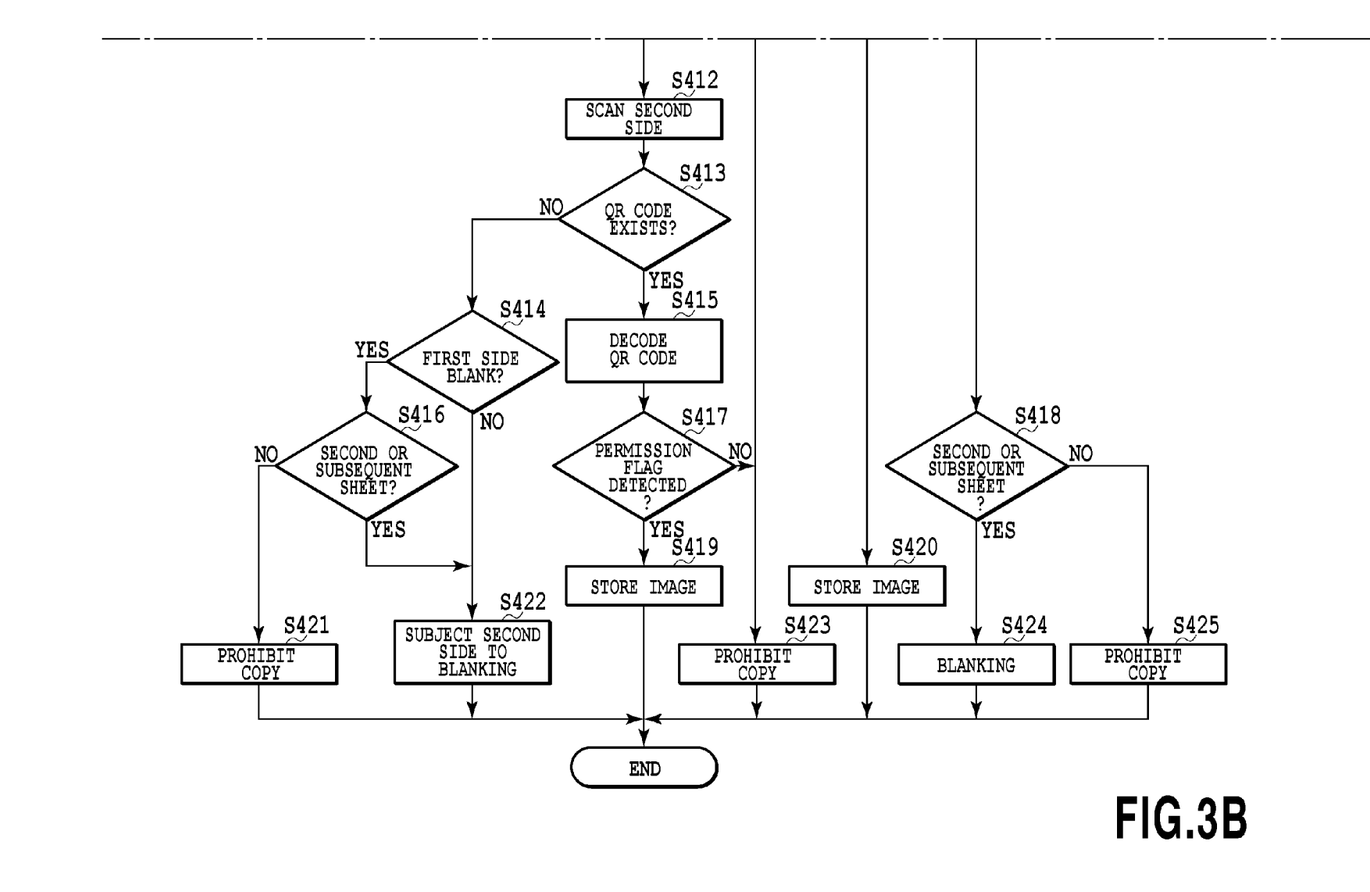
FIG. 3B is a flowchart of one sheet manuscript read operation in the present embodiment.
Figure 4:
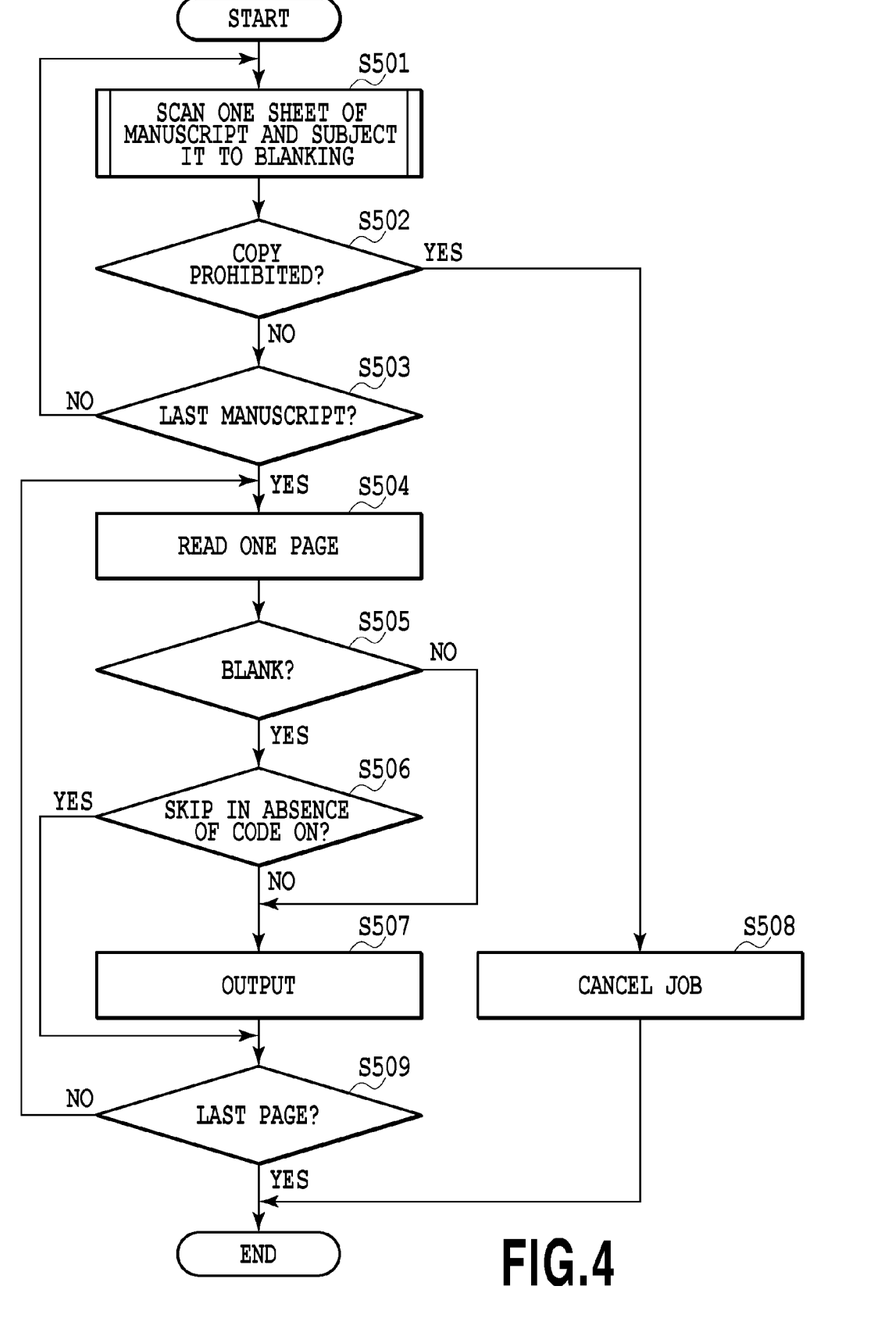
FIG. 4 is a flow chart of an output operation of the manuscript in the present embodiment.

The storage device 108 has stored therein various data including a program for implementing the processes shown in the flow chart of FIGS. 3A, 3B and 4. The control unit 101 controls other components included in the multi-function machine 100 and controls the processes of multi-function machine 100 in an integrated manner by executing the programs.

The scanner unit 102 optically reads the manuscript sequentially fed from a paper feed unit (not shown) and generates image data. The scanner unit 102 can read a plurality of sheets of the manuscript continuously, and can read both sides of the manuscript. The image read by the scanner 102 is stored in the storage device 108.

The printing unit 103 reads an image from the storage device 108 and prints it on a sheet of paper. The printing unit 103 is also capable of double-sided printing. A copy function is realized by reading the manuscript by the scanner unit 102, and printing it out by the printing unit 103. The receiving unit 104 can receive execution instructions of jobs such as copying by receiving key (hard key or soft key) inputs. The display unit 105 can display the job situation, alarms, errors, settings of the multi-function machine 100, or the like.

The transmitting unit 106 is connected to a network 109. The transmitting unit 106 is used for transmitting the image data, which has been read by the scanner unit and stored in the storage device 108, as electronic data attached to an E-Mail or the like, via the network 109 (referred to as transmitting function in the following).

If the control unit 101 detects a 2-dimensional QR code from the image read by the scanner unit 102, the QR code is sent to the decoder 107 and decoded. The scanner unit 102 can also read other codes such as a bar-code or an LVBC (Low Visibility Bar Code).

In the present embodiment, the multi-function machine 100 has a security function which limits output of the image to be output by the printing unit 103 or transmitting unit 106. The control unit 101 detects a QR code from the image read by the scanner unit and analyzes the QR code of the manuscript. The control unit 101 divides subsequent processes according to the detection result or the analysis result of the QR code. In addition, the QR code provided to the manuscript includes a copy permission flag indicating that copy of the manuscript is permitted, or a copy prohibition flag indicating that copy of the manuscript is prohibited. If a QR code is detected, the control unit 101 causes the decoder 107 to decode the QR code and, only when a copy permission flag is detected, performs printing by the printing unit 103 and transmission by the transmitting unit 106.

A manuscript 110 is provided with a copy permission code 111. Accordingly, decoding the copy permission code 111 by the decoder 107 results in detection of a copy permission flag, and a copy image 112 provided with a copy permission code 113 is output from the printing unit 103 or the transmitting unit 106. The copy permission code 110 is provided in a form such as a QR code, a bar-code, or an LVBC. The same goes for the copy permission code described below.

A manuscript 114 is provided with a copy prohibition code 115. Accordingly, decoding the copy prohibition code 115 by the decoder 107 results in detection of a copy prohibition flag, and the job is canceled. Even if no copy prohibition flag is detected by decoding the QR code 115, the job will be canceled unless a copy permission flag is detected.

A manuscript 116 is a manuscript which is not provided with a QR code, or a manuscript in which a QR code cannot be detected, and thus the job is canceled without outputting the manuscript.

Figure 2:
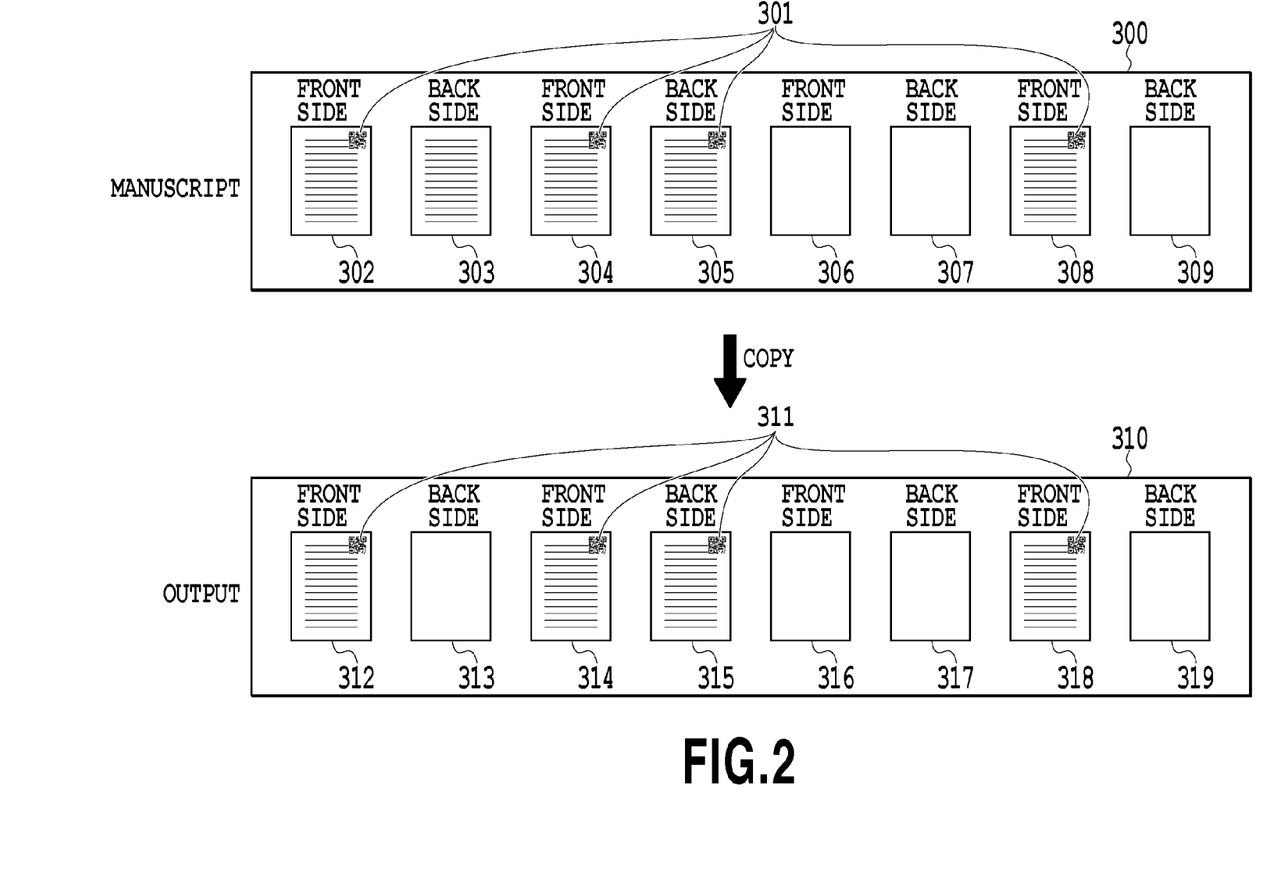
FIG. 2 illustrates an example of the blank sheet processing of both sides in the present embodiment.

FIG. 2 illustrates an exemplary processing of a double-sided manuscript of which at least one side is blank (nothing is printed) in the present embodiment. In order to copy a manuscript while ensuring security, the present embodiment operates so that a copy of an output 310 is obtained for double-sided sheets of a manuscript 300.

The manuscript 300 includes a plurality of double-sided sheets. Surfaces 302 to 309 express the front and back sides of each double-sided sheet. For example, the sides 302 and 303 respectively express the front and back sides of a single double-sided sheet. The sides 302, 304, 305 and 308 have a copy permission QR code 301 printed thereon. Although the side 303 is a printed side, no QR code is included therein. In addition, the sides 306, 307 and 309 are blank.

As the result of outputting the manuscript 300 in the double-sided copying mode, the output 310 includes sides 312 to 319. The sides 312 to 319 are respectively output images of the sides 302 to 309. The sides 312, 314, 315 and 318 have a copy permission QR code 311 printed thereon. The sides 313, 316, 317 and 319 are blank.

In the present embodiment, if a copy permission QR code is printed on either the front or back side of a double-sided manuscript, or if no QR code can be detected on the other side, the side having the copy permission code printed thereon is copied as-is, whereas the side on which no QR code can be detected is output as a blank sheet. Therefore, the sides 302, 304, 305 and 308 having the copy permission code 301 printed thereon are copied as-is, and output as copied sides 312, 314, 315 and 318. Although the sides 303 and 309 have no QR code printed thereon, they are respectively output as blank (white page) as the sides 313 and 319, because the copy permission code 301 is printed on the counterpart side.

The sides 306 and 307 have no QR code printed on their both sides making a pair. However, the copy permission code 301 is printed on the front side 304 and the back side 305 of a sheet before the sheet having the sides 306 and 307. Therefore, they are output as blank sides 316 and 317 respectively. In other words, if no QR code is printed on both sides of one sheet and a copy permission code is printed on both sides of the preceding sheet (or on at least one side of the preceding sheet), the output corresponding to the sheet having no QR code printed on the both sides is not skipped. Instead, a blank is output as a corresponding output.

Figure 5:
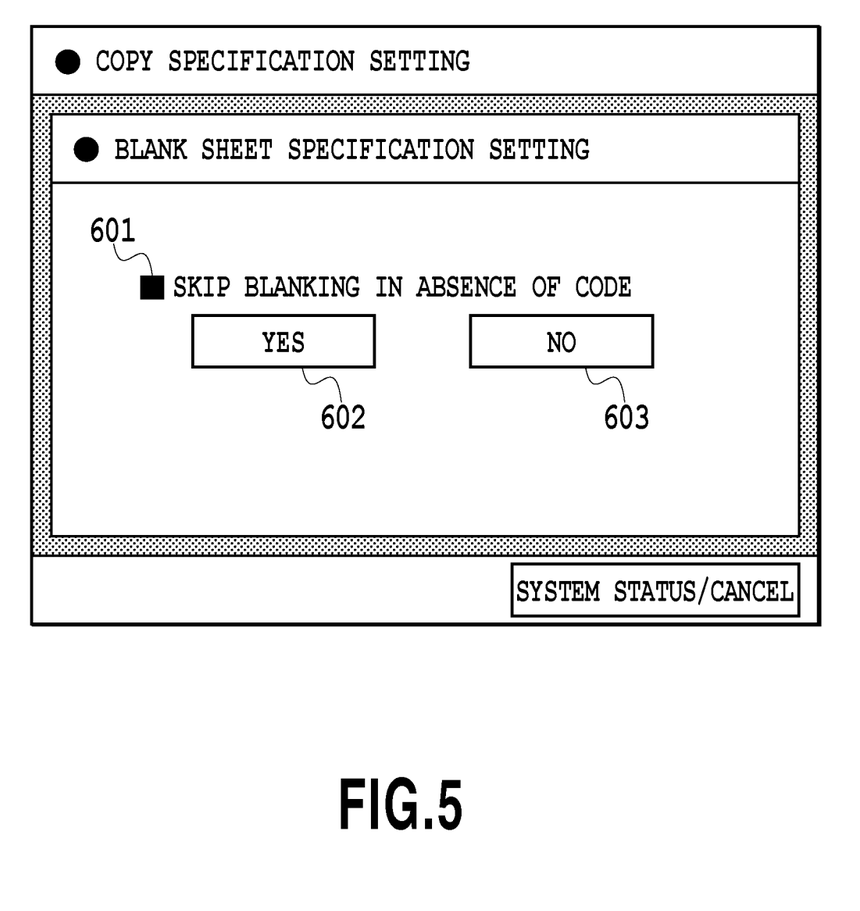
FIG. 5 illustrates a setting screen of a blank sheet specification setting in the present embodiment.

It may be configured such that, if no QR code is printed on both sides of one sheet of manuscript and a copy permission code is printed on the preceding sheet, the user uses an operation screen as shown in FIG. 5 to select whether or not to output the front and back sides as blank (white page). A toggle switch is associated with "Yes" 602 and "No" 603, only one of which being allowed to be selected.

FIGS. 3A and 3B show a flow chart of an operation of reading one sheet of manuscript by the multi-function machine 100 of the present embodiment. S401 to S426 in the figure denote respective steps of the operation. The process and flow of each step is realized by executing the program in the storage device 108 by the control unit 101 in the multi-function machine 100 to control respective components of the multi-function machine 100.

The flow is started when the receiving unit 104 receives the user's pressing of the start button, and the control unit 101 determines at S901 whether or not the scan setting of the started job is the double-side read mode.

In the case of the double-side read mode, one sheet of manuscript is scanned in a manner scanning the first side at S402 as the double-side read mode, whereas only one side of a sheet of manuscript is scanned at S403 in the case other than the double-side read mode. When scanning the first side at S402, which of the front or back side of the manuscript will be scanned depends on the configuration of the double-side reading of the scanner unit 102. Therefore, the embodiment does not particularly limit which of the front or back side of the manuscript will be scanned as the first side.

At S404, the control unit 101 determines whether or not a QR code exists in the image read at S401. If a QR code exists, the decoder 107 decodes the QR code at S406. If no QR code exists, the process flow proceeds to S410 where the read-in image is not stored in the storage device 108 and internal data is set indicating that the image is blank. If the internal data has been set indicating that the image is blank as described above, a blank image is generated and output at the output operation without reading an image from the storage device 108.

At S408, it is checked whether or not a copy permission flag has been set for the data obtained by decoding the QR code at S406. If a copy permission flag is detected, the process flow proceeds to S411 where the image scanned at S402 is stored in the storage device 108. If no copy permission flag is detected, the process flow proceeds to S423 where internal data is set indicating that copy of the manuscript scanned at S402 is prohibited. If a setting has been made to prohibit copy, it is supposed that the job will be canceled in the flow chart shown in FIG. 4, as described below.

According to the processes of S408 and S423 as described above, a setting is made to prohibit copy of the manuscript if no copy permission flag has been detected in the scanned image of the first side. Subsequently, the scan job is canceled without scanning the second side.

Upon completion of the process of S410 or S411 on the image of the first side, the process flow proceeds to S412 where a side (second side) opposite to the side of the manuscript read at S402 is scanned.

At S413, the control unit 101 detects whether or not a QR code exists in the image read at S412. If a QR code exists, the process flow proceeds to S415 where the decoder 107 decodes the QR code. If no QR code exists, the process flow proceeds to S414 where it is checked whether or not a side opposite to the side scanned at S402 is subject to blanking at S410.

If blanking has been performed (i.e., no QR code has been detected on both sides of the manuscript scanned at S402 and S412), the process flow proceeds to S416. If no blanking has been performed, internal data is set at S422 indicating that the image scanned at S412 is blank by a similar process to that at S410.

At S416, it is determined whether or not one sheet of manuscript including the two sides scanned at S402 and S912 is the second or subsequent sheet of manuscript for the scan job. If it is the second or subsequent sheet, internal data is set at S422 indicating that the image scanned at S412 (scanned image of the second side) is blank. If it is the first sheet of manuscript, internal data is set at S421 to indicate that copy of the manuscript is prohibited.

According to the processes of S414, S416, S421 and S422 as described above, the following process is performed if no QR code exists in the scanned image of the second side (No, at S413). That is, if the first side is not blank, the scanned image of the second side is set to be blank (S422). If the first side is blank and the target of the manuscript to be processed is the second or subsequent sheet, the scanned image of the second side is set to be blank (S422). If the first side is blank and the target of the manuscript to be processed is the first sheet of manuscript, a setting is made to prohibit copy of the manuscript (S421).

In other words, with the present embodiment, even if a code indicating copy permission cannot be detected on both sides of a certain sheet of manuscript, outputting a blank sheet is permitted as long as a code indicating copy permission has been detected on a sheet of manuscript previously read in the same stack of manuscript. By such a process, even if a both-side-blank sheet (e.g., insertion paper) is included in a stack of manuscript having a plurality of double-sided sheets of manuscript, the entire single job for the stack of manuscript will not be canceled.

In the present embodiment, even if no QR code has been detected in one sheet of manuscript, blanking (into a white page) is supposed to be performed as long as a copy permission QR code has been detected at least once in a sheet preceding the sheet of manuscript in the same job (same stack of manuscript), although not limited thereto. For example, blanking may be performed as long as a code indicating copy permission is detected in a sheet read immediately before, a sheet read immediately after, both of the sheets read immediately before and after, or any one sheet in the stack of manuscript. The multi-function machine 100 has a first switching unit for switching between the conditions according to which blanking is supposed to be performed (e.g., an operation screen for condition switching, a control program for switching depending on the type of output).

Furthermore, a second switching unit may be provided for switching between whether or not to cancel the entire scan job (i.e., stop the output corresponding to the image read from a sheet of the same stack of manuscript), if no QR code has been detected in one sheet of manuscript. If the second switching unit causes switching so as not to cancel the entire scan job, subsequent processes can be switched by the first switching unit.

At S417, it is checked whether or not a copy permission flag has been set for the data obtained by decoding the QR code at S415. If a copy permission flag is detected, the image scanned at S412 is stored in the storage device 108 at S419. If no copy permission flag is detected, internal data is set at S423 indicating that copy of the manuscript scanned at S412 is prohibited.

In other words when, according to the processes of S417 and S923, if no copy permission flag has been detected in the QR code included in the scanned image of the second side, a setting is made to prohibit copy of the manuscript. In addition, according to the processes of S417 and S419, if a copy permission flag has been detected in the QR code included in the scanned image of the second side, the image scanned at S412 is stored in the storage device 108.

If the scan setting of the job is not the double-side read mode, the control unit 101 determines at S405 whether or not a QR code exists in the image read at S403. If a QR code exists, the decoder 107 decodes the QR code at S407. If no QR code exists, the process flow proceeds to S418.

At S409, it is checked whether or not a copy permission flag rises for the data obtained by decoding the QR code at S407. If a copy permission flag is detected, the image scanned at S403 is stored in the storage device 108 at S420. If no copy permission flag is detected, internal data is set at S423 indicating that copy of the manuscript scanned at S403 is prohibited.

In other words, according to the processes of S409 and S423, if the scan setting of the job is the one-side read mode and no copy permission flag has been detected in the QR code included in the scanned image, a setting is made to prohibit copy of the manuscript.

At S418, it is determined whether or not the sheet scanned at S403 is the second or subsequent sheet of the stack of manuscript of the job. If it is the second or subsequent sheet, internal data is set at S424 indicating that the image scanned at S403 is blank. If it is the first sheet of manuscript, internal data is set at S425 indicating that copy is prohibited.

In other words, according to the processes of S418, S424 and S425, if the scan setting of the job is the one-side read mode and no QR code exists in the scanned image, a setting is made to prohibit copy of the first sheet of manuscript. The second and subsequent sheets of the manuscript are set to be blank.

FIG. 4 is a flow chart of an output operation of the manuscript in the present embodiment. Specifically, the flow chart illustrates execution of the process shown in FIGS. 3A and 3B on each sheet composing the stack of manuscript and an output operation of the manuscript subsequently performed by the multi-function machine 100.

S501 to S509 in the figure denote respective steps of the operation performed by the multi-function machine 100. The flow of the operation of each step is realized by executing the program in the storage device 108 by the control unit 101 in the multi-function machine 100 to control respective components of the multi-function machine 100.

The flow is started when the receiving unit 104 receives the user's pressing the start button. At S501, the processes of reading one sheet of manuscript and blanking of a page without a QR code shown in FIGS. 3A and 3B are performed.

At S502, it is determined whether or not a setting has been made at S421, S423 or S425 of FIG. 3B to prohibit copy of one sheet of manuscript to be processed. If a setting has been made to prohibit copy, the job is canceled and terminated at S508. In other words, the job is canceled without performing subsequent processes on the entire manuscript if the manuscript has a plurality of sheets. As a result, even a blank sheet will not be output. If no setting has been made to prohibit copy, the process flow proceeds to S503 where it is checked whether or not the sheet read at S501 is the last sheet. The process flow proceeds to S504 if it is determined at S503 that the sheet is the last sheet, whereas the next sheet is read at S501 if there still remains any sheet to be read.

At S504, image information equivalent to one side (one page) of one sheet of the stack manuscript processed at S501 (a value set for the above-mentioned internal data) is read from the storage device 108.

At S505, it is determined from the image information read at S504 whether or not blanking has been performed at S410, S422 and S424. If blanking has been performed, the process flow proceeds to S506. If no blanking has been performed, an image is read and output from the storage device 108 at S507.

The output at S507 is printing by the printing unit 103 in the case of the copy function, and outputting an image to the network 109 by the transmitting unit 106 in the case of the transmitting function. At S507, blank image (blank) data is generated and output if the image read at S504 has been output or subject to blanking. Additionally, in the copy function, it is assumed that a double-sided manuscript in which a sheet including a blank side (white page) coexists is output in the double-side copy mode. Therefore, it becomes possible to obtain an output similar to the manuscript by printing an image stored in the storage device 108 and a blank image (blank) sequentially on both sides.

At S506, it is determined whether to output the page which has been subject to blanking at S410, S422 or S424 as a blank image, or to skip (not to provide an output corresponding to the page). The determination is made based on the type of output (either printing or transmitting copied image data), the type of output manuscript (either double-side output or one-side output), or a preliminarily setting via the operation screen (the operation screen shown in FIG. 5, for example).

When printing by the copy function, for example, it is desirable to output a page which has been subject to blanking as a blank sheet because it is necessary to provide the output with the same layout of the front and back sides as the input manuscript. On the other hand, when outputting the copied image data to the network 109 by the transmitting function, the page which has been subject to blanking may be skipped because it may be convenient for the user not to output the page which has been subject to blanking. In addition, a blank image may be output in the case of the double-side output, or it may be skipped in the case of the one side output. Alternatively, outputting of both sides may be skipped if the both sides of the manuscript have been subject to blanking, or a blank image may be output if only one side has been subject to blanking. Furthermore, although a setting commonly applied to both the copy function and the transmitting function can be made on the operation screen shown in FIG. 5, the invention is not limited thereto. A setting separately applied to the copy function and the transmitting function may be made on the operation screen.

At S509, it is determined whether or not the image read at S504 is the last page. If it is the last page, copying or transmission is completed, whereas the next image is read at S509 if it is not the last page. Although transmission is performed on a page-by-page basis for the transmitting function in the present embodiment, the invention is not limited thereto, and image data of a plurality of pages to be transmitted may be collectively transmitted.

According to the processes shown in FIGS. 3A, 3B and 4 as described above, the following copy will be output if, for example, an instruction is provided to copy a manuscript in which a code indicating copy permission exists on the first side and the code does not exist on the second side. That is, a copy (printed matter or image data) will be output, with one side bearing thereon a copied image of the first side and the other side being blank (S404, S411, S412, S413, S414, S422, S502, S505, S506 and S507).

In addition, when it is instructed to copy a manuscript in which a code indicating copy permission does not exist on either side, the manuscript will not be copied (S414, S421, S502 and S508).

In addition, items corresponding to both sides of the manuscript will be output as blank (S416 and S422) when it is instructed to copy a manuscript in which a code indicating copy permission does not exist on either side, and if there exists a manuscript which has been permitted to be copied before the manuscript. When it is instructed to copy a manuscript in which a code indicating copy permission does not exist on either side, and if there exists no manuscript which has been permitted to be copied before the manuscript, no output will be provided (S416 and S421).

According to the present invention as described above, in the security mode in which only a manuscript provided with a copy permission code is output, a page without the code is output as a blank sheet if the copy permission code exists on the front or back sides, or at least in one sheet of the manuscript. As a result, a multi-function machine which can provide an output result as intended by the user can be provided without degrading the security level.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-001296, filed Jan. 6, 2011, which is hereby incorporated by reference herein in its entirety.

What is claimed is:

1. A copier comprising:
a scanner unit configured to scan front and back sides of a manuscript to obtain front and back side images in response to an instruction for copying the front and back sides of the manuscript on front and back sides of a sheet;
a detection unit configured to detect a two-dimensional code on each of the obtained front and back side images; and
a print unit configured, in a case that a two-dimensional code indicating copy permission has been detected in one image of the obtained front and back side images and no two-dimensional code has been detected in the other image not being blank, to print an image which is based on the one image on one side of the sheet not to print any image on the other side of the sheet.

2. The copier according to claim 1, wherein the print unit is configured, in a case that no two-dimensional code has been detected in any of the obtained front and back side images, not to print any image on the sheet.

3. A copying method comprising:
scanning front and back sides of a manuscript to obtain front and back side images in response to an instruction for copying the front and back sides of the manuscript on front and back sides of a sheet;
detecting a two-dimensional code on each of the obtained front and back side images; and
printing, in a case that a two-dimensional code indicating copy permission has been detected in one image of the obtained front and back side images and no two-dimensional code has been detected in the other image not being blank, an image which is based on the one image on one side of the sheet and not printing any image on the other side of the sheet.

4. A non-transitory computer-readable medium storing a program for causing a computer to perform the copying method according to claim 3.

5. The copier according to claim 1, wherein the one image is the obtained front side image, the other image is the obtained back side image, the one side is the front side of the sheet, and the other side is the back side of the sheet.

6. The copier according to claim 1, wherein the print unit is further configured, in a case that a two-dimensional code indicating copy permission has been detected in each image of the obtained front and back side images, to print an image which is based on the obtained front side image on the front side of the sheet and an image which is based on the obtained back side image on the back side of the sheet.

7. The copying method according to claim 3, further comprising not printing any image on the sheet, in a case that no two-dimensional code has been detected in any of the obtained front and back side images.

8. The copying method according to claim 3, wherein the one image is the obtained front side image, the other image is the obtained back side image, the one side is the front side of the sheet, and the other side is the back side of the sheet.

9. The copying method according to claim 3, further comprising printing, in a case that a two-dimensional code indicating copy permission has been detected in each image of the obtained front and back side images, an image which is based on the obtained front side image on the front side of the sheet and an image which is based on the obtained back side image on the back side of the sheet.

10. A non-transitory computer-readable medium storing a program for causing a computer to perform the copying method according to claim 7.

11. A non-transitory computer-readable medium storing a program for causing a computer to perform the copying method according to claim 8.

12. A non-transitory computer-readable medium storing a program for causing a computer to perform the copying method according to claim 9.

13. A copier comprising:
a scanner unit configured to scan front and back sides of a manuscript to obtain front and back side images in response to an instruction for copying the front and back sides of the manuscript on front and back sides of a sheet;
a detection unit configured to detect a two-dimensional code on each of the obtained front and back side images; and
an output unit configured:
in a case that a two-dimensional code indicating copy inhibition has been detected in the obtained front side image, not to output any sheet, regardless of the obtained back side image, and
in a case that neither a two-dimensional code indicating copy permission nor a two-dimensional code indicating copy inhibition has been detected in the obtained front side image, to output the sheet, the front side of the sheet being blank and not including any of the obtained front side image not being blank and the back side of the sheet including an image which is based on the obtained back side image if a two-dimensional code indicating copy permission has been detected in the obtained back side image.

14. A copier comprising:
a scanner unit configured to scan front and back sides of a manuscript to obtain front and back side images in response to an instruction for copying the front side of the manuscript on a first predetermined surface and the back side of the manuscript on a second predetermined surface;
a detection unit configured to detect a two-dimensional code on each of the obtained front and back side images; and
a print unit configured, in a case that a two-dimensional code indicating copy permission has been detected in one image of the obtained front and back side images and no two-dimensional code has been detected in the other image not being blank, to print an image which is based on the one image on the first predetermined surface and not to print any image on the second predetermined surface.

* * * * *